C. C. FOSS & C. L. WHITE.
WHEEL.
APPLICATION FILED MAR. 31, 1909.
942,819.
Patented Dec. 7, 1909.
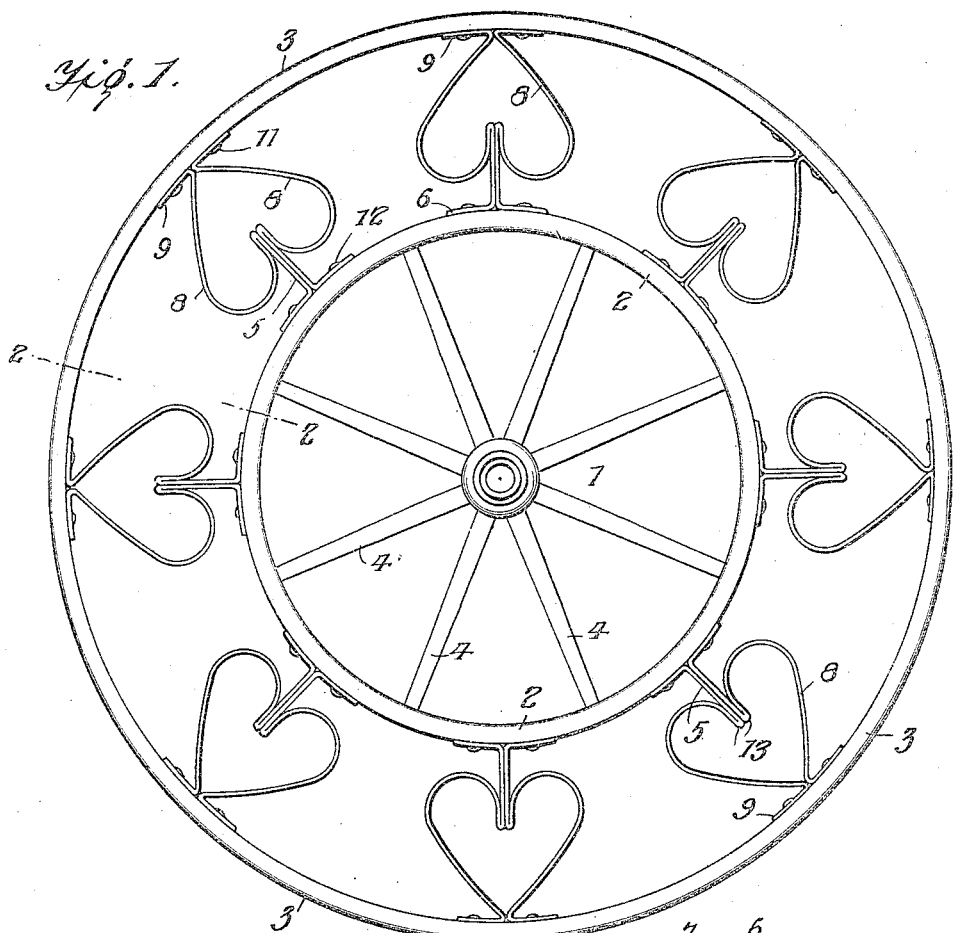
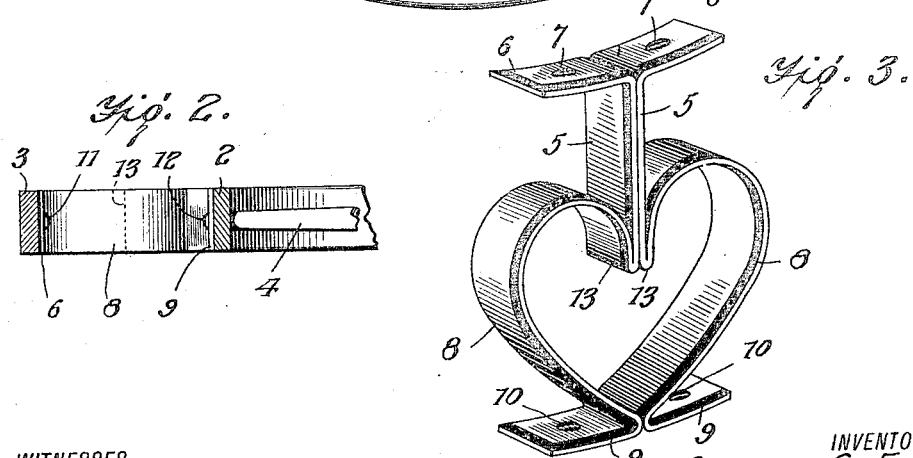
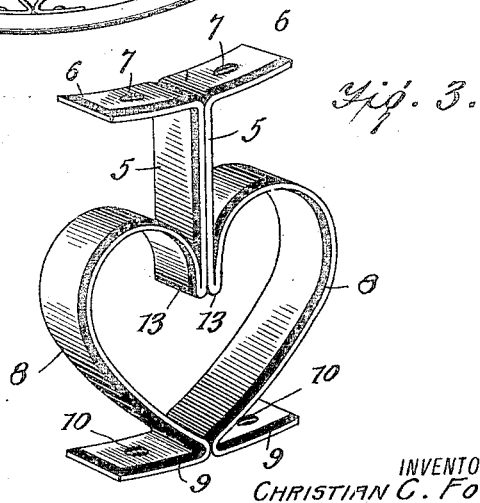
WITNESSES
INVENTORS
CHRISTIAN C. FOSS,
CHARLES L. WHITE,
BY
ATTORNEYS

UNITED STATES PATENT OFFICE.

CHRISTIAN C. FOSS AND CHARLES L. WHITE, OF QUITMAN, GEORGIA.

WHEEL.

942,819.  Specification of Letters Patent.  Patented Dec. 7, 1909.

Application filed March 31, 1909. Serial No. 486,863.

*To all whom it may concern:*

Be it known that we, CHRISTIAN C. FOSS and CHARLES L. WHITE, citizens of the United States, residing at Quitman, in the county of Brooks and State of Georgia, have invented a new and useful Improvement in Wheels, of which the following is a specification.

Our invention is an improvement in wheels, and consists in certain novel constructions and combinations of parts hereinafter described and claimed.

Referring to the drawings forming a part hereof, Figure 1 is a side view of the wheel. Fig. 2 is a partial transverse section of the wheel, and Fig. 3 is a perspective view of one of the springs.

The embodiment of the invention shown, consists of a hub 1, an inner rim 2, and an outer rim 3, the inner rim being connected to the hub by spokes 4, and to the outer rim by a plurality of cushion devices to be described.

The outer rim is resilient and may be of any suitable material, as may also the inner rim, the spokes and the hub, the inner rim being rendered substantially rigid by the spokes.

Each of the cushion devices consists of a plurality of similar sections, and the sections comprising a single cushioning device are arranged symmetrically with respect to each other, as will be evident from an inspection of Figs. 1 and 3.

Each section consists of a straight portion 5, provided at one end with an angular portion 6, having an opening 7 therethrough, and a curved portion 8, having at its end an angular portion 9, provided with an opening 10 therethrough.

The sections as before stated are arranged symmetrically, and with the straight portions 5 in contact, and with the curved portions 9 extending in opposite directions, and the lateral portions or lugs 9 are secured to the outer rim by bolts or rivets 11, while the angular portions, or lugs 6 are secured to the inner rim by bolts or rivets 12, the rivets traversing the openings 7 and 10.

It will be observed that at its commencement the curved portion 8 is bent backward upon the straight portion as at 13, while the end of the curved portion adjacent to the lugs 9 are in contact, when the cushions are assembled, so that the general outline of the spring portion proper is of the conventional heart or rather spade shape.

The straight portions 5 are radial with respect to the wheel, and the cushions as a whole, may lengthen and shorten in the direction of length of the said portions, to compensate for the shortening of the vertical and lengthening of the horizontal diameters of the wheel when in use.

We claim—

A wheel of the class described comprising a hub, an inner rim, spokes connecting the hub and the inner rim, an outer rim concentric with the inner rim and spaced apart therefrom and a plurality of cushioning devices connecting the rims and arranged therebetween, each of said devices comprising a plurality of similar and independent sections, the sections of a single device being symmetrically arranged with respect to each other, each section consisting of a straight portion having an angular lug abutting against the inner rim and secured thereto, and a portion curved backwardly alongside the straight portion, thence outwardly and thence inclined inwardly, and engaging the outer rim, the junction of said portion with the rim intersecting a line passing longitudinally of the straight portion, said portion having an angular lug for engaging the outer rim and secured thereto, said sections being arranged with the straight portion of one superposed on the straight portion of the other, and with the curved portions extending outwardly.

CHRISTIAN C. FOSS.
CHARLES L. WHITE.

Witnesses:
WILLIE A. REAMS,
RALPH B. HOPSON.